United States Patent
Feugnet et al.

(10) Patent No.: US 8,784,760 B2
(45) Date of Patent: Jul. 22, 2014

(54) PROCESS FOR RECOVERING CO2 FROM REGENERATION FLUE GAS COMING FROM A CATALYTIC CRACKING UNIT

(75) Inventors: Frederic Feugnet, Lyons (FR); Romina Digne, Lyons (FR); Pierre-Antoine Bouillon, Lyons (FR); Eric Lemaire, Anse (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 569 days.

(21) Appl. No.: 13/139,877

(22) PCT Filed: Nov. 26, 2009

(86) PCT No.: PCT/FR2009/001346
§ 371 (c)(1),
(2), (4) Date: Sep. 6, 2011

(87) PCT Pub. No.: WO2010/070212
PCT Pub. Date: Jun. 24, 2010

(65) Prior Publication Data
US 2012/0014853 A1   Jan. 19, 2012

(30) Foreign Application Priority Data
Dec. 16, 2008 (FR) .................... 08 07054

(51) Int. Cl.
*B01D 53/62* (2006.01)
*B01D 53/86* (2006.01)
*B01D 53/96* (2006.01)

(52) U.S. Cl.
USPC .......................................... 423/228; 423/229

(58) Field of Classification Search
None
See application file for complete search history.

(56) References Cited

U.S. PATENT DOCUMENTS

| 4,143,521 A | | 3/1979 | Pano et al. |
|---|---|---|---|
| 4,163,652 A | | 8/1979 | Gazzi et al. |
| 4,396,531 A | * | 8/1983 | Lomas ............................ 502/22 |
| 5,034,115 A | * | 7/1991 | Avidan ......................... 208/113 |
| 5,424,043 A | | 6/1995 | Martin et al. |
| 2006/0149115 A1 | | 7/2006 | Foral et al. |
| 2007/0169492 A1 | | 7/2007 | Geel et al. |
| 2008/0081938 A1 | | 4/2008 | Schultz et al. |
| 2008/0153689 A1 | | 6/2008 | Towler et al. |

FOREIGN PATENT DOCUMENTS

| EP | 0105939 A1 | 4/1984 |
|---|---|---|
| EP | 1676901 A1 | 7/2006 |
| EP | 1813343 A1 | 8/2007 |
| EP | 1935966 A1 | 6/2008 |

OTHER PUBLICATIONS

World IP Organization. "International Search Report and Written Opinion". PCT/FR2009/001346. Applicant: IFP. Mailed: Feb. 4, 2010.

* cited by examiner

*Primary Examiner* — Stanley Silverman
*Assistant Examiner* — Daniel Berns
(74) *Attorney, Agent, or Firm* — Millen, White, Zelano & Branigan, P.C.

(57) ABSTRACT

The invention describes an integrated process for capturing $CO_2$ emitted by at least a portion of the flue gas coming from the regeneration zone of a catalytic cracking unit using a unit for amine treatment of said flue gas, in which the catalytic cracking unit is equipped with an external exchanger using as the hot fluid a portion of the catalyst removed from the regeneration zone, the heat necessary for the amine treatment unit being supplied integrally by the catalytic cracking unit using the steam generated by said external exchanger.

7 Claims, 1 Drawing Sheet

PROCESS FOR RECOVERING CO2 FROM REGENERATION FLUE GAS COMING FROM A CATALYTIC CRACKING UNIT

FIELD OF THE INVENTION

The present invention relates to the field of capture of carbon dioxide emitted by the flue gas coming from regeneration of catalytic cracking units (abbreviated to FCC).

Catalytic cracking units generate combustion flue gas which comes from the regeneration of catalyst carried out in a reactor, termed the regenerator, in one or two stages. When regeneration is carried out in two stages, the first stage operates in a deficiency of air and carries out controlled temperature combustion, while the second stage operates in an excess of air and the temperature of the discharged flue gas can reach 800° C.

The present invention applies both to the case of single stage regeneration and to the case of two stage regeneration.

$CO_2$ contained in these combustion flue gas is captured using an amine treatment unit a detailed description of which can in particular be found in patent U.S. Pat. No. 7,056,482.

In the remainder of the text, the term "integrated process" will be used to designate the process of the present invention because this integrated process heat-couples the catalytic cracking unit, which has an excess of heat, with the amine fume treatment unit which requires heat to carry out regeneration of said amine.

In the remainder of the text, the catalytic cracking unit will be designated by its usual abbreviation of FCC (fluid catalytic cracking), and the amine fume treatment unit will for simplification be termed the amine unit, or occasionally the fume treatment unit.

EXAMINATION OF THE PRIOR ART

An essential aspect of the battle against the greenhouse effect is the capture of $CO_2$ which constitutes one of the main culprits thereof. In order to limit the phenomenon of climate warming, carbon dioxide is extracted from combustion flue gas with a view to sequestrating it, for example in underground reservoirs. Carbon dioxide discharges come for the most part from industrial activity (60% globally on average, 40% of which coming from flue gas from power stations for electricity production). In general, in refineries, the fluidized bed catalytic cracking unit (FCC) may be considered to be one of the biggest $CO_2$ emitters with close to 20% of emissions from it alone; the other sources are in the various reheating or distillation furnaces.

Clearly, then, FCC is a prime target when reducing $CO_2$ emissions from the refinery. The present invention proposes a solution which uses a known capture technology, termed amine capture, but develops profound thermal integration with the FCC unit so that it is possible to term it an integrated FCC/amine capture unit process. Further, the invention can demonstrate that it is possible to treat a fraction of flue gas coming from the FCC unit of 50% to 100%, with an overall level of $CO_2$ capture which in all cases is more than 46% and may even in some cases reach 95%.

The prior art regarding $CO_2$ capture uses an absorption process employing an aqueous amine solution to extract $CO_2$ and $H_2S$ from a gas. The gas is purified by bringing it into contact with the absorbant solution, then the absorbant solution is regenerated thermally.

A process for the treatment of gas using amines generally comprises the following steps:

a) bringing the gas to be treated into contact with an absorbant solution comprising amines in aqueous solution in order to obtain a gas which is depleted in acidic compounds and comprises traces of amines, and an absorbant solution which is enriched in acidic compounds;

b) regenerating at least a fraction of the absorbant solution which is enriched in acidic compounds in a regeneration column to obtain a regenerated absorbant solution and a gaseous effluent which is rich in acidic compounds, the regenerated absorbant solution being recycled to step a) as the absorbant solution;

c) partially condensing said gaseous effluent by cooling to obtain a cooled effluent composed of liquid condensates and a gas which is enriched in acidic compounds, then introducing at least a portion of the condensates into the regeneration column;

d) bringing the gas which is depleted in acidic compounds obtained in step a) into contact with a stream of liquid water to obtain a gas which is depleted in amine and water enriched in amine;

e) recycling a portion of the amine-enriched water obtained from the bottom of the scrubbing section, carrying out the following operations thereby:
  mixing said amine-enriched portion of water with the regenerated absorbant solution obtained in step b);
  introducing said amine-enriched portion of water into the regeneration column;
  mixing said amine-enriched portion of water with the gaseous effluent obtained in step b);
  mixing said amine-enriched portion of water with the absorbant solution enriched in acidic compounds obtained in step a).

Regeneration of the absorbant solution carried out in step b) may be carried out by steam heating. Said steam is conventionally generated in a boiler which can burn any type of fuel, from coal to natural gas.

Clearly, when the steam is generated by combustion of a fossil fuel, the $CO_2$ emitted in this step is counted in with the overall $CO_2$ balance of the amine unit. Broadly, but in order to provide an idea, in current amine treatment technologies, for one tonne of absorbed $CO_2$ approximately 0.4 tonnes of $CO_2$ is produced by combustion linked to the regeneration of the absorbant solution.

BRIEF DESCRIPTION OF THE INVENTION

Figure 1:
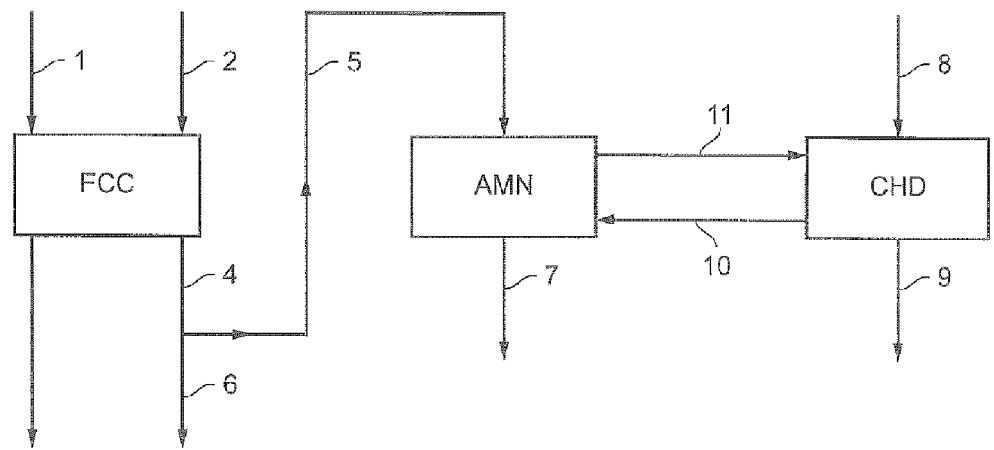
FIG. 1 shows a layout in accordance with the prior art in which the FCC unit has an excess of heat and the amine treatment unit is associated with a boiler which provides it with the heat necessary for amine regeneration.

The present invention can be defined as an integrated process for treatment of at least a portion of the flue gas coming from a catalytic cracking unit in view of recovering $CO_2$ contained in said flue gas, said treatment consisting in an absorption of $CO_2$ in an aqueous solution of amines, the heat necessary for amine regeneration being integrally supplied by the steam, or any other fluid vector, generated in the FCC unit.

In general, the excess heat obtained in the FCC unit comes from an exchanger generating steam using, as the hot fluid, a portion of the catalyst removed at one or more points of the regeneration zone of the FCC unit.

The cooled catalyst is re-introduced into the regeneration zone at a point which is distinct from the removal point.

In principle, other sources of energy exist in a FCC unit (cooling of flue gas, principal fractionation), but the energy recovered in these other sources is generally completely used in the FCC unit per se (compressors, steam consumption). Thus, in the present invention the energy available for FCC is considered to come from the external exchanger which is set in parallel to the regeneration zone.

In FCC units, catalyst regeneration is generally carried out using two regeneration stages, a first stage operating with a deficiency of air, which means that the temperature of the catalyst can be limited to approximately 650/700° C., and a second stage operating in an excess of air, and in which the temperature of the catalyst can reach or exceed 800° C.

Each of the regeneration stages functions in fluidized bed mode at fluidization rates in the range 30 cm/s to 1 m/s. The two stages are connected via a tubular zone which can transport the catalyst in an entrained bed from the first stage to the second stage.

In the case of a two stage regeneration, the hot catalyst is generally removed from the second stage (functioning at approximately 800° C.) and re-introduced to a point of the first stage (functioning at approximately 650° C.).

When regeneration is carried out using a single regeneration stage, the catalyst is removed from a point in said stage and re-introduced to another point of said stage which is distinct from the previous point.

The flue gas coming from the catalyst regeneration reactors contain solid particles, carbon monoxide (CO), oxides of nitrogen ($NO_x$) and oxides of sulphur ($SO_x$). They are thus sent to a fume treatment section before being sent to the amine treatment unit. A flue gas treatment section may include the following elements:
  one or more additional gas/solid separators to eliminate more catalyst particles;
  an expansion turbine to convert the energy of the pressure into electricity;
  a CO incinerator to convert CO to $CO_2$;
  a "de-$NO_x$" unit to reduce the oxides of nitrogen in the flue gas;
  a flue gas cooler to recover heat from the flue gas and thus produce the steam;
  a scrubber unit to reduce the quantity of particles and oxides of sulphur in the flue gas.

The external exchanger in which heat is transferred between the hot catalyst and the fluid generated, usually HP steam, is a device which is known in the prior art as a cat cooler, essentially consisting of an exchange bundle immersed in the hot catalyst in the fluidized state. Low pressure steam (below 8 bars) could also be produced in this exchanger; this is preferred for regenerating amine, with the steam then having a temperature of below 160° C.

The present invention is neither linked to the technology of the external exchanger, nor to the mode of regeneration in one or two stages. Further, it can be applied to all or a portion of the flue gas coming from the regeneration zone. As an example, it may be possible to treat only the flue gas coming from a single regeneration stage or all of the flue gas coming from the first stage, or all of the flue gas coming from the second stage.

In the same manner, the present invention is compatible with all amine treatment unit technologies.

In the integrated process for capturing $CO_2$ emitted by the flue gas coming from a FCC unit in accordance with the invention, the catalytic cracking unit can operate under severe conditions, i.e, a C/O ratio in the range 4 to 15, preferably in the range 5 to 10, and with a temperature at the riser outlet in the range 510° C. to 580° C., preferably in the range 520° C. to 570° C.

In the integrated process for capturing $CO_2$ emitted by the flue gas coming from a FCC unit in accordance with the invention, the hydrocarbon feed treated in the catalytic cracking unit may have a Conradson carbon residue in the range 6 to 10.

Finally, the integrated process for capturing $CO_2$ emitted by the flue gas coming from a FCC unit in accordance with the invention allows that a proportion of more than 50% by weight of the flue gas coming from the regeneration zone of the catalytic cracking unit can be sent to the amine unit.

The amine used in the amine treatment unit is generally selected from the following group: MEA (monoethanolamine), DEA (diethanolamine), MDEA (dimethylethanolamine), DIPA (diisopropylamine), DGA (diglycolamine), diamines, piperazine, hydroxyethyl piperazine and TMHDA (tetramethylhexane-1,6-diamine).

Preferably, the amine is selected from the group formed by MEA (monoethanolamine), DEA (diethanolamine), MDEA (dimethylethanolamine); highly preferably, MEA (monoethanolamine) is selected.

Finally, the integrated process for capturing $CO_2$ emitted by the flue gas from a FCC unit in accordance with the invention may use the absorbant compound tetramethylhexane-1,6-diamine, generally known as TMHDA, in the amine treatment unit.

DETAILED DESCRIPTION OF THE INVENTION

Figure 2:
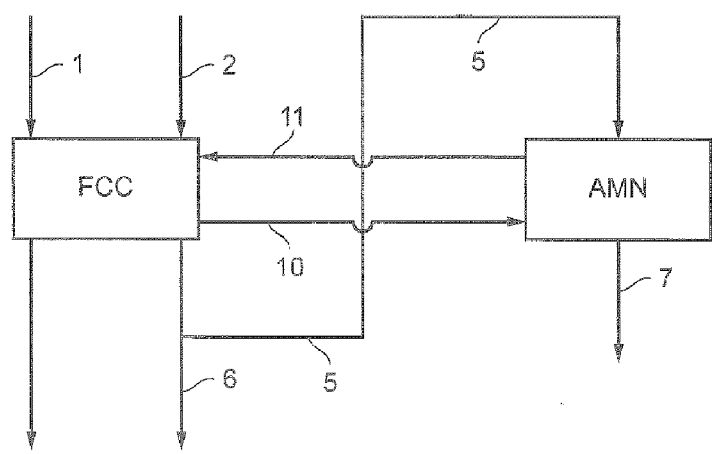
FIG. 2 shows a layout in accordance with the process of the invention in which the heat necessary for amine regeneration is integrally provided by steam, or any other fluid which can act as a thermal vector, generated in the FCC unit.

The process of the present invention will be better understood by comparing prior art FIG. 1 with FIG. 2, which is in accordance with the present invention.

The abbreviations in parentheses refer to the units, and the numbers in parentheses refer to the streams entering or leaving said units.

FIG. 1 is a layout of a process using a catalytic cracking unit (FCC) and an amine unit (AMN) for treating flue gas coming from the regeneration section of said catalytic cracking unit (FCC). The unit for treatment of flue gas with amines is associated with a boiler (CHD) which provides the heat necessary for regeneration of the amine.

The catalytic cracking unit is supplied with a hydrocarbon feed of the vacuum distillate or atmospheric residue type (1) and provides products which are essentially $C_1$, $C_2$, $C_3$ gases, a gasoline cut, a gas oil cut, a heavy "slurry" cut, and a certain quantity of coke deposited on the catalyst. The coke is burned off in the regeneration zone supplied with air (2), which produces combustion flue gas principally constituted by $CO_2$, $H_2O$ and CO. The combustion flue gas are sent to a section for the treatment of flue gas in order to burn the CO and $CO_2$ and to reduce the quantities of particles and oxides of nitrogen and of sulphur in the flue gas. Next, a portion (5) or all of the treated flue gas (4) is sent to the amine treatment unit (AMN). The treatment of the flue gas in the FCC unit may be adjusted in order to satisfy certain constraints regarding inputs to the amine treatment, for example the quantity of $NO_x$ and $SO_x$.

The amine unit requires heat to regenerate the amine which is supplied by the boiler (CHD) supplied with streams of oxidizer and fuel (8) and which generates a stream of steam (10). The condensed steam (11) is returned to the boiler (CHD) in a loop which is well known by the skilled person.

FIG. 2, in accordance with the invention, can be described in the same manner as for FIG. 1 but no longer has a boiler associated with the amine treatment unit (AMN). The heat necessary for regeneration of the amine is supplied integrally by the steam (10) generated in the catalytic cracking unit (FCC) using an external exchanger (not shown in FIG. 2).

A description of this type of exchanger can, for example, be found in patent U.S. Pat. No. 5,324,696.

According to the invention, the amine unit does not necessarily treat all of the flue gas emitted by the FCC. The proportion of flue gas treated with the amine unit depends on a number of factors, the principal one being the production of coke in the FCC unit.

The heavier the feed (expressed as its Conradson carbon residue, denoted CCR and measured in accordance with ASTM D 189), the more loaded is the catalyst with coke at the end of the reaction, and the more heat generated by the catalyst on regeneration is recovered by the external exchanger. At the same time, the quantity of $CO_2$ in the flue gas is also increased.

However, because available crudes are changing, FCC is now tending to use heavier feeds. Presently, feeds with a Conradson carbon residue of 8 to 10 are routinely being treated. The present invention is in this regard perfectly synchronized with the trend in catalytic cracking and can exploit the heat generated by the external exchanger in a particularly advantageous manner.

A further trend in FCC is that known as petrochemical FCC, since it consists in operating the FCC under conditions encouraging the production of propylene. These operational conditions are severe conditions, corresponding to C/O ratios in the range 4 to 15, and riser outlet temperatures of more than 550° C.

These operational conditions are accompanied by an increase in the quantity of coke deposited on the catalyst at the end of the reaction, and thus an increase in the heat available to the external exchanger. Here again, the present invention is perfectly synchronized with this second trend in FCC units.

The following examples are intended to demonstrate that it is possible to treat between 51% and 94% of regeneration flue gas coming from the FCC unit in view of recovering $CO_2$, by using only the heat available at the external exchanger.

EXAMPLES

Example 1

In this example, we simulated catalytic cracking of an atmospheric residue (Arabian heavy) in a FCC unit including an external exchanger.

The functional characteristics and the principal yields of the catalytic cracking unit are shown in Table 1 below.

TABLE 1

| (characteristics of FCC unit) | |
|---|---|
| Feed flow rate, principal riser | 161 t/h |
| Outlet temperature, principal riser | 550° C. |
| Temperature, regenerator 1 | 654° C. |
| Temperature, regenerator 2 | 710° C. |
| Heat exchanged with external exchanger | 26.8 MW |
| C/O ratio | 8.0 |
| Dry gas yield | 7.3 Wt % |
| Propylene yield | 7.2 Wt % |
| Gasoline yield ($C_5$ - 220° C.) | 41.9 Wt % |
| Coke yield | 9.5 Wt % |

TABLE 1-continued

| (characteristics of FCC unit) | |
|---|---|
| Flow rate of $CO_2$ produced by FCC unit | 49.5 t/h |
| Heat power from external exchanger | 26.8 MW |
| Excess energy | +23.6 MW |

The power actually available to the external exchanger (23.6 MW) was only 88% of the theoretical power (26.8 MW) because of the various items of consumption.

Table 2 compares the overall $CO_2$ emission from prior art processes (FIG. 1) with that in accordance with the invention (FIG. 2).

TABLE 2

| (comparison between prior art and invention) | | | |
|---|---|---|---|
| | Unit | Prior art (FIG. 1) | Invention (FIG. 2) |
| Flow rate of $CO_2$ generated by FCC not entering amine unit (stream 6) | t/h | | 24.1 |
| Flow rate of $CO_2$ entering amine unit (stream 5) | t/h | | 25.4 |
| Absorption of $CO_2$ in amine | % | | 90 |
| Flow rate of $CO_2$ discharged into atmosphere (stream 7) | t/h | | 2.5 |
| Power necessary to regenerate amine | MW | | 23.6 |
| Flow rate of $CO_2$ discharged into atmosphere due to boiler (stream 9) | t/h | 9.0 | 0.0 |
| Total flow rate of $CO_2$ discharged into atmosphere | t/h | 35.6 | 26.6 |

In order to regenerate the amine, the amine treatment unit had available steam produced by a coal boiler for the prior art process, and produced by the external exchanger of the FCC unit for the process of the invention.

The heat power necessary to regenerate the amine was the same in the prior art and in the invention since the FCC and amine treatment units were identical.

The heat power necessary for regeneration of the amine was equal to the excess energy from the FCC unit. In the case of this example, 51% of the FCC flue gas were treated in the amine unit.

The boiler associated with the amine unit generated combustion flue gas, namely 9 t/h of $CO_2$, to which the fraction of untreated $CO_2$ derived from the flue gas from the cracking unit (24.1 t/h) and the $CO_2$ discharged from the amine unit (2.5 t/h) linked to its absorption yield (90%) had to be added.

In total, 35.6 t/h of $CO_2$ was discharged into the atmosphere in the prior art process, i.e. 72% of the $CO_2$ produced by the FCC unit.

In the process of the invention, only 26.6 t/h of $CO_2$ was discharged into the atmosphere, i.e. 54% of the $CO_2$ produced by the FCC unit. The total flow rate of $CO_2$ discharged into the atmosphere was thus reduced by 25% in the process of the invention compared with that which it would be in a prior art process with a boiler for amine regeneration.

Example 2

In this example, we simulated catalytic cracking of the same atmospheric residue as in Example 1, but with a catalyst which was less selective as regards coke. The operating conditions for the FCC were very close to those of Example 1.

The functional characteristics and the principal yields are indicated in Table 3 below.

TABLE 3

(characteristics of FCC unit)

| | |
|---|---|
| Feed flow rate, principal riser | 161 t/h |
| Outlet temperature, principal riser | 550° C. |
| Temperature, regenerator 1 | 655° C. |
| Temperature, regenerator 2 | 711° C. |
| Heat exchanged with external exchanger | 54.7 MW |
| C/O ratio | 7.8 |
| Dry gas yield | 7.3 Wt % |
| Propylene yield | 6.9 Wt % |
| Gasoline yield ($C_5$ - 220° C.) | 39.9 Wt % |
| Coke yield | 12.1 Wt % |
| Flow rate of $CO_2$ produced by FCC unit | 63.4 t/h |
| Heat power from external exchanger | 54.7 MW |
| Excess energy | +55.3 MW |

Table 4 compares the overall $CO_2$ emission from prior art processes (FIG. 1) and in accordance with the invention (FIG. 2).

TABLE 4

(comparison between prior art and invention)

| | Unit | Prior art (FIG. 1) | Invention (FIG. 2) |
|---|---|---|---|
| Flow rate of $CO_2$ generated by FCC not entering amine unit (stream 6) | t/h | | 3.9 |
| Flow rate of $CO_2$ entering amine unit (stream 5) | t/h | | 59.5 |
| Absorption of $CO_2$ in amine | % | | 90 |
| Flow rate of $CO_2$ discharged into atmosphere (stream 7) | t/h | | 5.9 |
| Power necessary to regenerate amine | MW | | 55.3 |
| Flow rate of $CO_2$ discharged into atmosphere due to boiler (stream 9) | t/h | 20.9 | 0.0 |
| Total flow rate of $CO_2$ discharged into atmosphere | t/h | 30.7 | 9.8 |

In order to regenerate the amine, the amine treatment unit had available steam produced by a coal boiler for the prior art process, and produced by the external exchanger of the FCC unit for the process of the invention.

The heat power necessary to regenerate the amine was the same in the prior art and in the invention since the FCC and amine treatment units are identical.

This heat power is equal to the excess energy of the FCC unit. In this example, 94% of the FCC flue gas were treated in the amine unit.

The boiler associated with the amine unit generated combustion flue gas, namely 20.9 t/h of $CO_2$, to which the fraction of untreated $CO_2$ derived from the flue gas from the cracking unit (3.9 t/h) and the $CO_2$ discharged from the amine unit (5.9 t/h) linked to its absorption yield (90%) had to be added. In total, 30.7 t/h of $CO_2$ was discharged into the atmosphere in the prior art process, i.e. 48% of the $CO_2$ produced by the FCC unit.

In the process of the invention, only 9.8 t/h of $CO_2$ was discharged into the atmosphere, i.e. 15% of the $CO_2$ produced by the FCC unit. The total flow rate of $CO_2$ discharged into the atmosphere is thus reduced by 68% in the process of the invention compared with what it would be in a prior art process with a boiler for amine regeneration.

Table 5 below summarizes the examples.

TABLE 5

(summary of examples)

| | Example 1 | | Example 2 | |
|---|---|---|---|---|
| | Prior art | Invention | Prior art | Invention |
| % of FCC flue gas treated in amine unit | 51% | 51% | 94% | 94% |
| Overall $CO_2$ discharge (t/h) | 35.6 | 26.6 | 30.7 | 9.8 |
| Capture of $CO_2$ produced by FCC | 28% | 46% | 52% | 85% |

The summarizing table 5 clearly shows that with the layout of the invention, the capture of $CO_2$ emitted by the regeneration flue gas coming from the catalytic cracking unit is very substantially increased with respect to the prior art layout, also saving on the equipment (furnace or boiler) providing the heat required for amine regeneration.

The invention claimed is:

1. An integrated process for capturing $CO_2$ emitted by at least a portion of the flue gas coming from the regeneration zone of a catalytic cracking unit (FCC) treating a vacuum distillate or atmospheric residue hydrocarbon cut with a Conradson carbon residue (CCR) in the range 6 to 10, under high severity conditions with a C/O ratio of 5 to 10, and with a riser outlet temperature of 520° C. to 570° C., said process comprising treating said flue gas with amine in an amine treatment unit, wherein the amine is MEA (monoethanolamine), DEA (diethanolamine), or MDEA (dimethylethanolamine), wherein the catalytic cracking unit is equipped with an external exchanger employing a hot fluid, and wherein the hot fluid comprises a portion of the catalyst removed from the regeneration zone, and wherein the heat for the amine treatment unit is supplied integrally by the catalytic cracking unit by steam generated by said external exchanger.

2. An integrated process for capturing $CO_2$ emitted by the flue gas coming from a FCC unit according to claim 1, in which the proportion of flue gas coming from regeneration in the catalytic cracking unit which is treated by the amine treatment unit is more than 50% by weight.

3. An integrated process for capturing $CO_2$ emitted by the flue gas coming from a FCC unit according to claim 1, in which the amine is MEA (monoethanolamine).

4. An integrated process for capturing $CO_2$ emitted by the flue gas coming from a FCC unit according to claim 1, in which the amine treatment unit comprises tetramethylhexane-1,6-diamine.

5. An integrated process for capturing $CO_2$ emitted by the flue gas coming from a FCC unit according to claim 1, in which the steam generated in the external exchanger associated with the FCC unit is a low pressure steam of less than 8 bars with a temperature of less than 160° C.

6. An integrated process for capturing $CO_2$ emitted by the flue gas coming from a FCC unit according to claim 1, in which the flue gas sent to the amine treatment unit comes from a first stage of the regeneration zone of the catalytic cracking unit.

7. An integrated process for capturing $CO_2$ emitted by the flue gas coming from a FCC unit according to claim 1, wherein the regeneration zone contains a second stage, and in which process the flue gas sent to the amine treatment unit comes from the second stage of the regeneration zone of the catalytic cracking unit.

* * * * *